(No Model.) 2 Sheets—Sheet 1.
C. F. LEOPOLD.
MEAT CUTTING MACHINE.
No. 340,794. Patented Apr. 27, 1886.
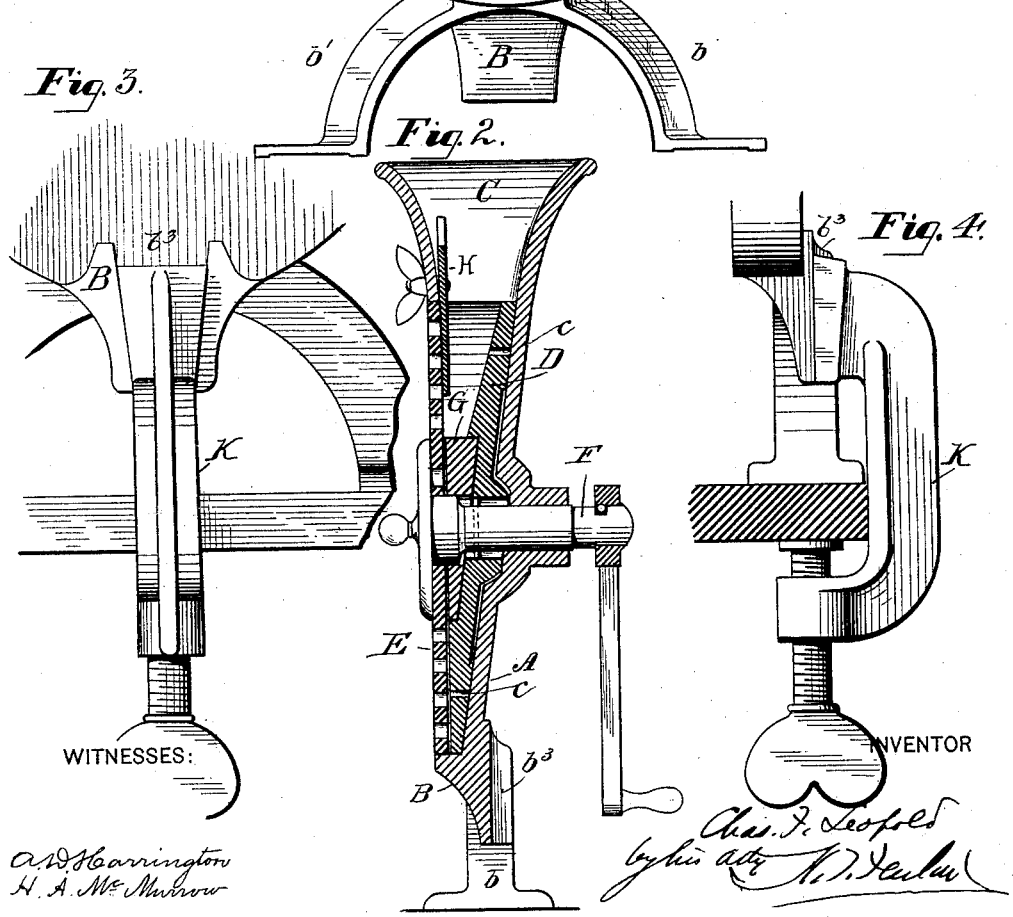

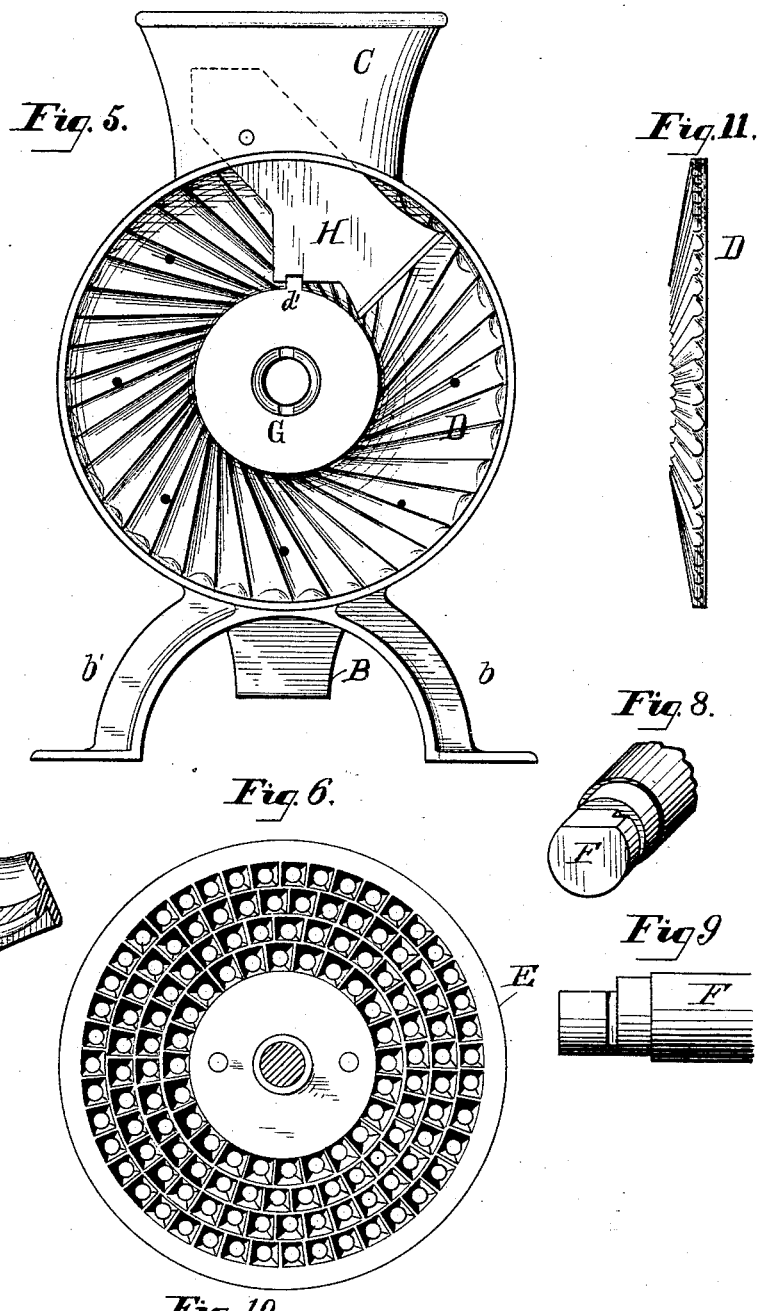

UNITED STATES PATENT OFFICE.

CHARLES F. LEOPOLD, OF PHILADELPHIA, PENNSYLVANIA, ASSIGNOR TO THE LLOYD & SUPPLEE HARDWARE COMPANY.

MEAT-CUTTING MACHINE.

SPECIFICATION forming part of Letters Patent No. 340,794, dated April 27, 1886.

Application filed February 28, 1885. Serial No. 157,345. (No model.)

*To all whom it may concern:*

Be it known that I, CHARLES F. LEOPOLD, a citizen of the United States, residing in the city of Philadelphia, in the State of Pennsylvania, have invented certain new and useful Improvements in Meat-Cutting Machines, of which the following is a full, clear, and exact description, reference being had to the accompanying drawings, forming a part of this specification.

My invention relates to machines for finely dividing meat and other compressible substances; and it consists of mechanism whereby the meat is compressed between two revolving disks, the faces of which converge toward each other at the base of the machine and diverge from each other at the top at each revolution of the driving-shaft, and stationary cutting-knives placed on either side of the outer disk, which is perforated, and also in the several detailed parts of the machine, as hereinafter more particularly described.

In the accompanying drawings, Figure 1 is an end view of the machine, showing the perforated revolving disk, stationary cutting-knives, and hopper; Fig. 2, a vertical section through the center of the machine. Figs. 3 and 4 are views of the clamping device for securing the machine to a stand and table. Fig. 5 is an end view of the machine, with the perforated disk and outside knife removed, and shows the inner knife, inner disk, and annular beveled collar or washer between the two disks; Fig. 6, a view of the inside surface of the perforated disk, and Fig. 10 a sectional view of same; Fig. 7, a view of the crank-handle; Figs. 8 and 9, views of the end of the driving-shaft, recessed and grooved to form a locking device with the journal (see Fig. 7) of the crank-handle; and Fig. 11 an edge view of the inner disk.

The metal frame or casing A is provided with a stand, B, having two legs, $b\ b'$, and recessed at $b^3$ to receive the beveled end of the clamping device, (shown in Figs. 3 and 4,) whereby the machine is firmly secured to a stand or table. The casing A is made deep and gradually shallowing to suit the form, position, and motion of the rotating disks, hereinafter described, and it terminates at its top in an open receiver or hopper, C, for the reception of the meat. The said casing is beveled on the inner surface of its closed end to form a surface-guide for the inside revolving disk, D, and is recessed longitudinally to form a journal for the driving-shaft F. The outer and open end of said casing A is closed by means of the outer perforated disk, E, which latter fits snugly in said open end, and is secured permanently to the shaft F and revolves with it. Between said disks E and D is placed an annular collar or washer, G, bored out longitudinally through the center to permit the passage through it of the driving-shaft, and is beveled on one side to correspond with the inner surface of the closed end of the casing A, so that said beveled surfaces—viz., of the collar G and inside surface of the casing A—shall be in planes substantially parallel with each other. Said collar is held stationary by being provided with a pin, $d'$, which fits in a corresponding recess in the side of the inside knife, H, which latter is stationary, is securely fixed to the inside of the casing A, and has a blade which lies flat against the inner surface of the outside perforated revolving disk, E. The beveled conformation of the collar G has no effect on the motion of the disks, but is of necessity of the form described, for the purpose only of permitting such described motion of the disk D, and said collar is for the purpose of forming a channel or guide for the meat to prevent it reaching the center of the machine and interfering with the driving-shaft, and also to direct the meat to that part of the surface of the disk E that is perforated. The inside disk, D, is bored out longitudinally through its center to permit the passage through it of the driving-shaft, and which longitudinal hole is large enough to permit the said disk to have a wabbling or laterally-vibrating motion from its center for and simultaneously with each of its revolutions. Such motion of the disk is produced by contact of its flat outside face with the inner beveled surface of the closed end of the casing, which latter is so constructed with a beveled face for the sole purpose of so guiding the rotating disk and causing it to vibrate laterally from its center simultaneously with its rotary motion. It is thus rotated by the shaft by means of a pin thereon fitting into a recess in the drilled-out longitudinal hole in the center of the disk. It is also beveled from its center toward its periphery on its inside surface, in order to bring the faces of the two rotating disks into close contact where they converge toward each other at the base of the machine, and as the outside surface of said disk D lies flat against the beveled surface of the closed end of the casing A the friction produced by contact therewith would impede its revolving motion unless it was perforated in one or more places, as at $c\ c$, which permit the fat juices of the meat to penetrate to the surface of the casing and lubricate the same.

In order to more effectually bring the meat or other compressible substance to be divided between the rotating disks with rapidity and certainty, the inner disk, D, is grooved upon its inner surface, which is beveled toward the periphery from the central circular recess. Said beveled face is grooved with grooves beginning at the central recess and extending outward and widening to the periphery, and said grooves are not radiating diametrically from the center, but are at an angle of about forty-five degrees from a diametrical line across the face of the disk through the center.

Securely affixed to the outside of the casing A by means of a set-screw is a knife, J, the blade of which lies flat against the outside surface of the perforated disk E. Said disk is a flat annular plate provided with perforations of peculiar conformation, as shown in Figs. 1 and 6. In the former is shown the outside of the disk, in which the perforations appear as round holes. In the latter it is seen that all the surplus metal between the holes on the inside of the disk is cut away, so that the perforations appear substantially of the form shown in the section Fig. 10—that is to say, rectangular or square or other form having straight sides—the object being to reduce as much as possible the obstructing surface between the holes on the inside of the disk to the passage of the meat through the perforations. Both the knives H and J are preferably spring-blades, bent with a tendency of the cutting-edge to bear against the inside and outside surfaces, respectively, of the disk E, and are both made adjustable as to pressure thereon by means of set-screw fastenings.

The machine is secured to a stand or table by means of the clamping device shown in Figs. 3 and 4, which consists of an arm, K, its lower bent end being slotted to admit of the passage of a clamping thumb-screw, and its upper bent end being provided with a dovetail projection, and which dovetail projection fits into a corresponding dovetail recess in the stand B of the casing A.

The driving-shaft F is cylindrical in form for the greater part of its length, except where it extends beyond the journal in the casing, that part being provided with a device to lock it to the journal of the crank-handle, constructed as follows: Said cylindrical end of the shaft has an arc of the circle cut away to form a flat surface to a depth equal to the width of the journal of the crank-handle, and is recessed in a direction at right angles with said flat surface of the shaft to a depth equal to the thickness of a pin driven through the journal at a tangent, thus forming a projection on the inside surface of the journal of the crank, and said shaft F having been reduced in diameter at said end previous to being cut away and recessed, as described, the larger diameter forms a shoulder, which is a guide or gage to bring the said parts into position when the said end of the shaft is inserted into the journal of the crank. The flat side of the shaft permits it to pass the pin or projection, which is thus brought in line with the right-angled recess, when a revolution of the crank-handle in the direction in which it is intended the shaft shall turn brings the pin or projection on the journal of the crank-handle into the recess on the shaft and locks it therein, from which it is released by a reversed movement of the parts, as described.

The operation of the machine is as follows: Meat is introduced into the hopper C and falls down into the space formed by the divergence of the disks from each other at the top of the machine. A revolution of the shaft F carries with it the disks E and D, the former rotating constantly in the same plane, while the latter has a lateral vibratory motion from its center, caused by the inclined or beveled surface of the inner side of the closed end of the casing. The result is that as the disk D rotates that portion of it which was originally in contact with the disk E at the bottom of the casing diverges from it gradually during the half-revolution to the top of the casing and then again converges toward it gradually during the following half-revolution to reach its original position at the bottom of the casing, and so on for each revolution of the disks, the result being to compress the meat and force it through the perforations in the said disk E, and in such action of the parts to bring the ejected meat against the sharp edge of the outside cutting-blade, J. The inside knife, H, is mainly for the purpose of cleaning the inner surface of the disk E and cutting away the hard and tough sinews and skin, which would otherwise clog the machine by being wrapped around the surfaces between the perforations in said disk. It will be seen that as the outside knife, J, is stationary, and has its flat cutting-blade lying close against the outside surface of the disk E, the meat which is ejected through the perforations of the latter by the compressing action of the inner disk, D, is carried by the revolutions of said perforated disk E against the sharp blade of the knife J and cut into finely-divided particles.

Having thus described my invention, what I claim as my invention, and desire to secure by Letters Patent, is—

1. The combination, with a casing having a closed end provided with an inner beveled surface, of two disks rotated by a central shaft, the outer disk being perforated and revolving continuously in the same plane, and the inner having a lateral vibratory motion from its center simultaneously with its revolving motion, and a stationary cutting-blade bearing against the outside surface of said perforated disk, whereby meat or other compressible substance is forced against said perforated disk and through the perforations thereof, and is cut by contact with said stationary cutting-blade, substantially as described.

2. The combination, with a suitable casing, of a central rotating shaft having a disk secured thereto and forming the outer end of said casing, said disk being perforated by holes rectangular or straight sided upon the inside face and passing to a circular form on the outside face of said disk, mechanism to force meat or other compressible substance against said rotating disk, a stationary cutting-blade secured to said casing and having a flat knife-edge bearing against the outer perforated surface of said rotating disk, and a stationary clearing-blade bearing against the inner surface of said disk, substantially as set forth.

3. The combination, with a casing having a closed end, provided with a beveled inside surface, and a central shaft passing longitudinally through the same, of a disk rotated by said shaft and having a simultaneous lateral vibratory motion from its center, whereby any compressible substance may be forced with pressure against a perforated plate in the opposite end of said casing, substantially as described.

4. The combination, with a suitable casing, of a perforated disk forming one end of said casing, and rotated by means of a central shaft passing longitudinally through said casing, a second disk having a lateral vibratory motion from its center simultaneously with its revolution, a central collar between said disks, beveled to conform to the motions of said disks, and a stationary cutting-blade bearing against the outside surface of said perforated disks, substantially as set forth.

5. The combination, with a suitable casing, of a central rotary shaft carrying two disks, with mechanism whereby said disks are caused to diverge from and converge toward each other at the same time, but at diametrically-opposite points on their inner faces at each half-revolution thereof, one of said disks closing the outer end of said casing, and being perforated by holes rectangular or straight-sided upon the inside, passing to a circular form on the outside, and the other of said disks being provided on its inner beveled face with grooves radiating from the center, widening toward the periphery, and at an angle from a diametrical line across the face of said disk, whereby meat or other compressible substance is compressed between said disks at the convergence thereof, and thence carried by the said grooves of the inner disk against the straight-sided perforations of the outer disk, and there divided and forced through said perforations, substantially as set forth.

6. The combination, with a suitable casing, of a perforated disk forming the outer end thereof, mechanism for forcing meat or other compressible substance under pressure against said disk, and a central driving-shaft operating said forcing mechanism, and having its projecting cylindrical end provided on a part of its periphery with a flat surface and recessed at right angles with said flat surface, and a crank-handle having a journal provided with an internal projection to fit said recess in the end of the shaft and lock in the same, substantially as and for the purpose described.

In testimony whereof I have hereunto affixed my signature this 19th day of February, A. D. 1885.

CHARLES F. LEOPOLD.

Witnesses:
H. T. FENTON,
FRANCIS S. BROWN.